United States Patent
Itou et al.

(10) Patent No.: US 9,074,538 B2
(45) Date of Patent: Jul. 7, 2015

(54) ABNORMAL COMBUSTION DETECTION APPARATUS AND CONTROL UNIT OF INTERNAL COMBUSTION ENGINE

(75) Inventors: Akito Itou, Kariya (JP); Ryotaro Kuno, Ichinomiya (JP); Daisuke Kawakami, Anjo (JP)

(73) Assignee: DENSO CORPORATION, Kariya (JP)

( * ) Notice: Subject to any disclaimer, the term of this patent is extended or adjusted under 35 U.S.C. 154(b) by 442 days.

(21) Appl. No.: 13/603,500

(22) Filed: Sep. 5, 2012

(65) Prior Publication Data

US 2013/0060451 A1 Mar. 7, 2013

(30) Foreign Application Priority Data

Sep. 6, 2011 (JP) ................................. 2011-193832

(51) Int. Cl.
G01M 15/12 (2006.01)
F02D 35/02 (2006.01)
G01L 23/22 (2006.01)
F02D 41/28 (2006.01)

(52) U.S. Cl.
CPC ........ F02D 35/027 (2013.01); F02D 2200/025 (2013.01); G01L 23/225 (2013.01); G01L 23/226 (2013.01); F02D 2041/286 (2013.01); F02D 2041/281 (2013.01); G01M 15/12 (2013.01)

(58) Field of Classification Search
CPC ... G01M 15/12; G01L 23/222; G01L 23/225; G01L 23/226; F02D 2200/025
USPC ........... 701/111; 123/406.21, 406.29, 406.37, 123/406.38; 73/114.07
See application file for complete search history.

(56) References Cited

U.S. PATENT DOCUMENTS

| | | | | |
|---|---|---|---|---|
| 4,648,367 A | * | 3/1987 | Gillbrand et al. | 123/406.26 |
| 5,146,777 A | * | 9/1992 | Polito et al. | 73/35.04 |
| 5,205,258 A | * | 4/1993 | Hashimoto et al. | 123/406.37 |
| 5,394,330 A | * | 2/1995 | Horner | 701/101 |
| 5,419,180 A | | 5/1995 | Yamada et al. | |

(Continued)

FOREIGN PATENT DOCUMENTS

| | | |
|---|---|---|
| JP | 4-186135 | 7/1992 |
| JP | 5-340331 | 12/1993 |

(Continued)

OTHER PUBLICATIONS

Office Action (2 pages) dated Sep. 17, 2013, issued in corresponding Japanese Application No. 2011-193832 and English translation (2 pages).

Primary Examiner — Erick Solis
(74) Attorney, Agent, or Firm — Nixon & Vanderhye PC

(57) ABSTRACT

An abnormal combustion detection apparatus detects an abnormal combustion of an internal combustion based on a vibration waveform from a vibration sensor attached to the internal combustion engine. A gain circuit of the apparatus amplifies or attenuates the vibration waveform from the vibration sensor, an AD conversion circuit converts a waveform provided by the gain circuit to digital data, and a gain switching unit switches a gain of the gain circuit from a small gain value to a large gain value at a gain switch timing. The gain switching unit separates a large abnormal combustion from a small abnormal combustion in an abnormal combustion determination period for maximizing a dynamic range of an AD conversion circuit and for securely detecting a change of waveform amplitude in case of gain switching in an abnormal combustion detection operation.

11 Claims, 5 Drawing Sheets

(56) References Cited

U.S. PATENT DOCUMENTS

| | | |
|---|---|---|
| 6,105,552 A | 8/2000 | Anisawa et al. |
| 7,254,475 B1* | 8/2007 | Grai et al. ............. 701/111 |
| 7,594,423 B2* | 9/2009 | Padhi et al. ............ 73/35.09 |
| 8,312,760 B2* | 11/2012 | Buganza et al. ......... 73/35.05 |
| 8,324,905 B2* | 12/2012 | Barrett ................. 324/464 |
| 8,713,992 B2* | 5/2014 | Bengtsson ............. 73/35.08 |
| 2002/0179053 A1* | 12/2002 | Kokubo et al. ....... 123/406.33 |
| 2003/0164164 A1* | 9/2003 | Butler, Jr. ............. 123/606 |
| 2004/0084036 A1* | 5/2004 | Porter et al. ............ 123/634 |
| 2009/0308146 A1 | 12/2009 | Gautrot et al. |
| 2012/0291524 A1* | 11/2012 | Bengtsson ............ 73/35.08 |

FOREIGN PATENT DOCUMENTS

| | | |
|---|---|---|
| JP | 9-229823 | 9/1997 |
| JP | 2008-064023 | 3/2008 |
| JP | 2013-19341 | 1/2013 |

* cited by examiner

ABNORMAL COMBUSTION DETECTION APPARATUS AND CONTROL UNIT OF INTERNAL COMBUSTION ENGINE

CROSS REFERENCE TO RELATED APPLICATION

The present application is based on and claims the benefit of priority of Japanese Patent Application No. 2011-193832, filed on Sep. 6, 2011, the disclosure of which is incorporated herein by reference.

TECHNICAL FIELD

The present disclosure generally relates to an abnormal combustion detection apparatus detecting abnormal combustion of an internal combustion engine and a control unit of the internal combustion engine having the abnormal combustion detection apparatus of the internal combustion engine.

BACKGROUND

The abnormal combustion of an internal combustion engine is conventionally detected by a vibration sensor coupled to the engine, and by analyzing a waveform detected by such sensor. For instance, Japanese Patent Laid-Open No. 2008-524489 (JP '489) discloses how to detect the abnormal combustion, but no concrete configuration of a circuit to acquire the waveform from the vibration sensor is disclosed.

For instance, to securely acquire a waveform from a vibration sensor in a turbo-charged small engine, a waveform of abnormal combustion having 40 fold magnitude of a normal waveform may be accepted. In order to detect the abnormal combustion by using one AD conversion circuit, a big waveform of the abnormal combustion must be attenuated to be within an input range of the AD conversion circuit. Therefore, if the 40 fold magnitude of the normal waveform is attenuated to fit to the input range of the AD conversion circuit, a gain of a gain circuit must be set to have a small value, such as 1/40. In such setting, the abnormal waveform from a small abnormal combustion is attenuated to have a very small waveform, thereby making it very difficult to detect the small abnormal combustion.

In order to resolve such problem, Japanese Patent Laid-Open No. H05-340331 (JP '331), discloses a knocking control apparatus having a large knock determination unit separately from a normal knock determination unit. The apparatus in JP '331 prevents an overflow of a knock detection signal by a large knock, based on a gain switching according to a determination result by the large knock determination unit.

However, the apparatus of JP '331 switches the gain after detecting the size of the waveform. Therefore, the apparatus cannot properly detect a micro knock due to the delay of the gain switching not properly reflecting a violently changing knock detection signal amplitude in each of the knock determination periods.

SUMMARY

In an aspect of the present disclosure, an abnormal combustion detection apparatus detects an abnormal combustion of an internal combustion engine based on a vibration waveform from a vibration sensor attached to the internal combustion engine. The apparatus includes a gain switching unit for switching a gain of a gain circuit from a small gain value to a large gain value at a gain switching timing in an abnormal combustion determination period, which enables a separation of a small abnormal combustion from a large abnormal combustion. By switching the gain of the gain circuit from a small value to a large value, the dynamic range of an AD conversion circuit is effectively used.

The large abnormal combustion is usually finished by the gain switching timing. Therefore, the gain switching for switching the gain of the gain circuit allows detection of the abnormal combustion.

The large abnormal combustion is a spontaneous ignition, and generally occurs prior to the ignition timing. Therefore, the magnitude of the abnormal combustion is different before and after the ignition timing of the internal combustion engine. Thus, by switching the gain of the gain circuit with reference to the ignition timing, the switching of the gain may be performed at an appropriate timing.

Since the digital data oversampled at the AD conversion circuit is filtered by the digital filter, the noise of the digital data in the signal frequency band is reduced. However, the digital filter retroactively uses the past data inputted as multiple sets of data, thereby causing a ringing due to the large change of the digital data if the gain is switched during the input of the vibration waveform in the above-described configuration. Therefore, in addition to the above, the gain difference before and after the gain switching is configured to be cancelled, the large change of the digital data is prevented and the ringing is avoided. In such case, the calculation of the amplitude difference between the pre-gain switching output data and the post-gain switching output data based on the digital data from the digital filter primarily requires a process for canceling the gain difference. However, per the present disclosure, the output data from the digital filter may be compared with each other as it is, thereby reducing the process load for processing the data.

In addition to the above, the gain difference between the gains of the gain circuit before and after the gain switching can easily be cancelled by using the shift register. That is, the digital data of the gain of the gain circuit is stored in the shift register in a shifted state, shifted by the number of bits according to the binary number of magnification of the gain. Therefore, by using, as the data of the digital filter, the digital data in the shift register stored in the shifted state, cancellation of the gain difference between the gains before and after the gain switching is made easy.

Further, the gain switching is not performed during an input of a signal having the large vibration waveform caused by the large abnormal combustion when such signal is input to the AD conversion circuit. Therefore, the correction calculation for correcting an amplitude value of the gain before and after the gain switching may not be required.

Further, the internal combustion engine is properly controlled according to the magnitude of the abnormal combustion.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

An embodiment of the present disclosure is described in the following with reference to the drawings.

Figure 1:
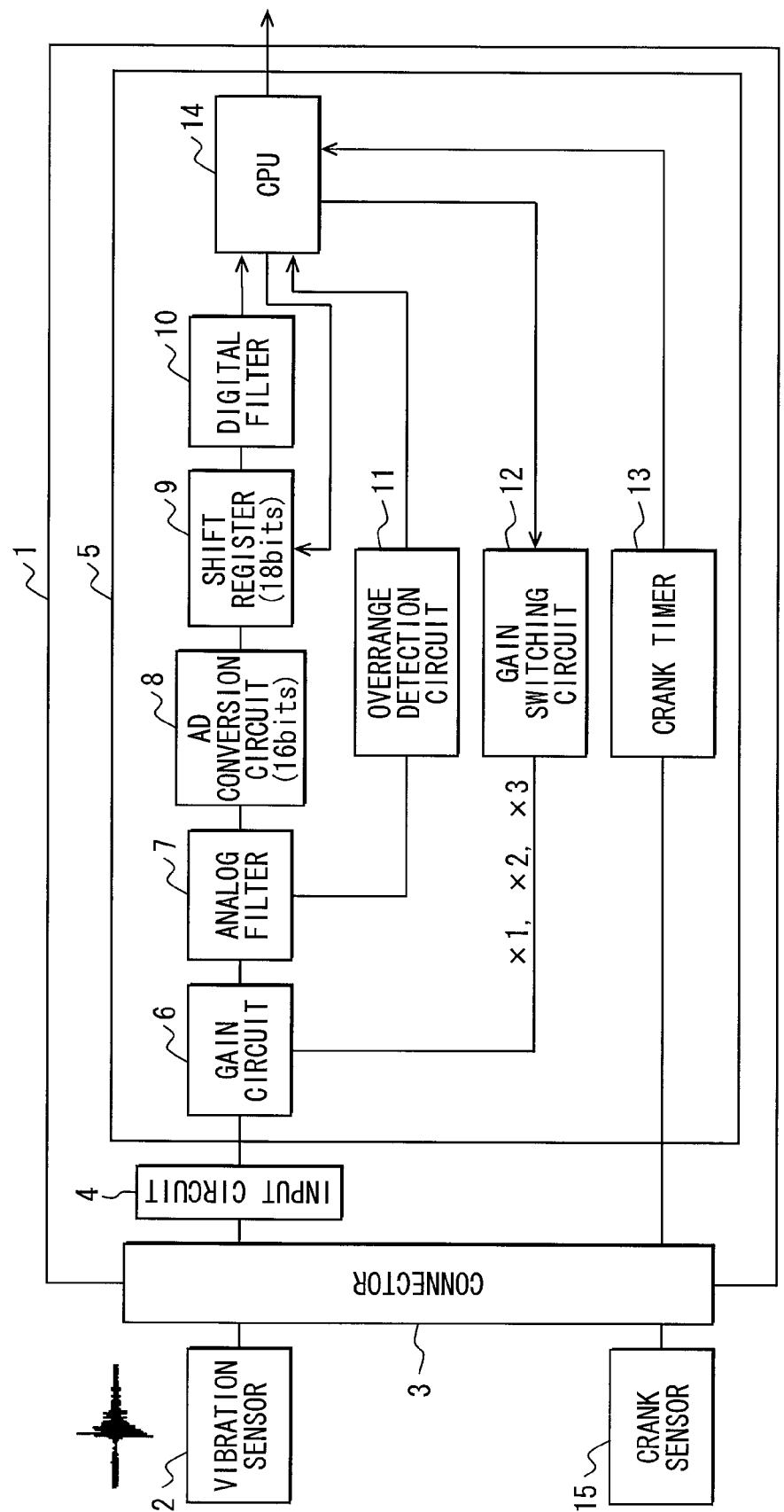
FIG. 1 is a block diagram of an engine control apparatus of the present disclosure.

With reference to FIG. 1 an engine control apparatus 1 controls a four cylinder-type gasoline engine (i.e., an internal combustion engine). The engine control apparatus 1 may be provided as an abnormal combustion sensing apparatus and a control unit in claims.

A vibration sensor 2 is installed in a cylinder block of the engine (not illustrated). The vibration sensor 2 detects a vibration of the cylinder block of the engine, and outputs a signal (i.e., an abnormal combustion signal) corresponding to the vibration of the cylinder block at the time of detecting the abnormal combustion. The magnitude of the combustion is determined based on the waveform size of the abnormal combustion signal, whether it is a small abnormal combustion or a large abnormal combustion.

Figure 2:
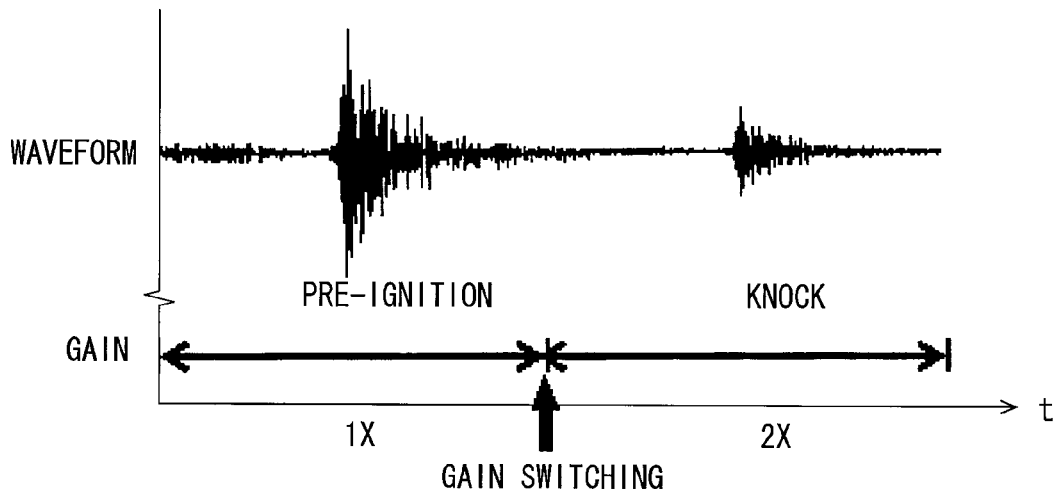
FIG. 2 is an illustration of an abnormal combustion signal of the present disclosure.

FIG. 2 shows an illustration of an abnormal combustion signal from the vibration sensor 2. The abnormal combustion represented by the abnormal combustion signal may be classified into a small abnormal combustion and a large abnormal combustion. The small abnormal combustion, which may be referred to as a knock, is a vibration of the cylinder block that occurs when fuel in a combustion chamber spontaneously ignites prior to an ignition via a spark plug at an uneven mixture portion of the fuel and air, especially at a thicker fuel portion, or an end gas portion closer to a cylinder end, which are prone to a spontaneous ignition.

The large abnormal combustion, which may be referred to as a pre-ignition, is a vibration of the cylinder block due to an abnormal combustion prior to the ignition via the spark plug, caused by a heat spot (i.e., a heat source) such as a red-heated carbon in the engine or a part of the spark plug itself. For the illustration purpose, the amplitude of the small abnormal combustion is greater than the actual scale, as demonstrated by the gain switching in FIG. 2.

The abnormal combustion signal from the vibration sensor 2 is provided to the engine control apparatus 1 via a connector 3. The engine control apparatus 1 includes an input circuit 4 and a microcomputer 5. The input circuit 4 converts the abnormal combustion signal into one which centers around 2.5 V, by passing a high frequency signal component corresponding to the abnormal combustion signal and by removing an unnecessary portion, such as a low frequency signal component, for example, less than 5 kHz, including the direct current component from the input signals.

The microcomputer 5 includes a gain circuit 6, an analog filter 7, a 16-bit AD conversion circuit 8, a shift register 9 (i.e., a correction unit in claims), a 18-bit digital filter 10, an over-range detection circuit 11 (i.e., a detection unit in claims), a gain switching circuit 12 (i.e., a gain switching unit in claims), a crank timer 13, a CPU 14, together with a ROM and a RAM which are not illustrated. The microcomputer 5 may be referred to as an abnormal combustion determination period setting unit and a determination unit in claims.

The gain circuit 6 amplifies a signal provided by the input circuit 4 with a predetermined amount of gain. In the present embodiment, the gain of the gain circuit 6 can be set to one of three values, either 1×, 2×, or 4×, all of which correspond to binary numbers.

The analog filter 7 is an anti-alias filter for removing the alias from 1 MHz sampling by the AD conversion circuit 8, and the cutoff frequency is set to 318 kHz. The AD conversion circuit 8 has a resolution of 16 bits, using a sampling frequency of 1 MHz. By having a 1 MHz sampling frequency, a sufficiently over-sampling frequency of 1 MHz against the maximum frequency of 23 kHz in the abnormal combustion signal, the attenuation (i.e., damping) of the signal in a less-than 23 kHz band is prevented, and the folding noise, or aliasing, is reduced in such frequency band.

The digital data of 16 bits output from the AD conversion circuit 8 is stored in the shift register 9 of 18 bits, from a top bit, or the most significant bit, and the digital data of 18 bits stored in the shift register 9 is used as the data of the digital filter 10. In such case, the shift register 9 is shifted to a lower digit side according to a gain set in the gain circuit 6 by the CPU 14. That is, in other words, when the gain is 1×, no shift is performed, and when the gain is 2×, 1 bit shift is performed, and when the gain is 4×, 2 bit shift is performed. This is about the prevention of ringing generated at the digital filter 10 by canceling the gain difference set to the gain circuit 6 before and after the gain switching, which will be described later.

The digital filter 10 is set up for the removal of aliasing in the decimation and for the noise reduction in the Nyquist frequency (i.e., ½ of the sampling frequency) in the over-sampling. The passing frequency band of the digital filter 10 is set equal to or smaller than 23 kHz.

The engine has a crank sensor 15 installed thereon, and the crank sensor 15 provides to the crank timer 13 a pulse signal every time the crank shaft rotates a predetermined angle of, for example, 180 degrees. The crank timer 13 detects, based on a signal from the crank sensor 15, a top dead center (TDC) interval period, which is an interval between two top dead centers, and is provided to the CPU 14.

By executing various engine control programs stored in the ROM, the CPU 14 controls a fuel injection amount and a fuel injection timing of a fuel injection valve, an ignition timing of the spark plug, a valve opening timing of an intake valve and an exhaust valve. Further, the CPU 14 estimates a crank angle (CA) with reference to the TDC timing based on the TDC interval period, and sets, as the abnormal combustion determination period, a period during which the CA falls in the predetermined angle range. In the present embodiment, the abnormal combustion determination period is set between a −20 degree timing before the TDC timing (i.e., BTDC 20° CA timing) and a 70 degree timing after the TDC timing (i.e., ATDC 70° CA timing) of each cylinder.

The CPU 14 sets the abnormal combustion determination period for determining the magnitude of the abnormal combustion based on the size of the waveform of the abnormal combustion signal.

Figure 4:
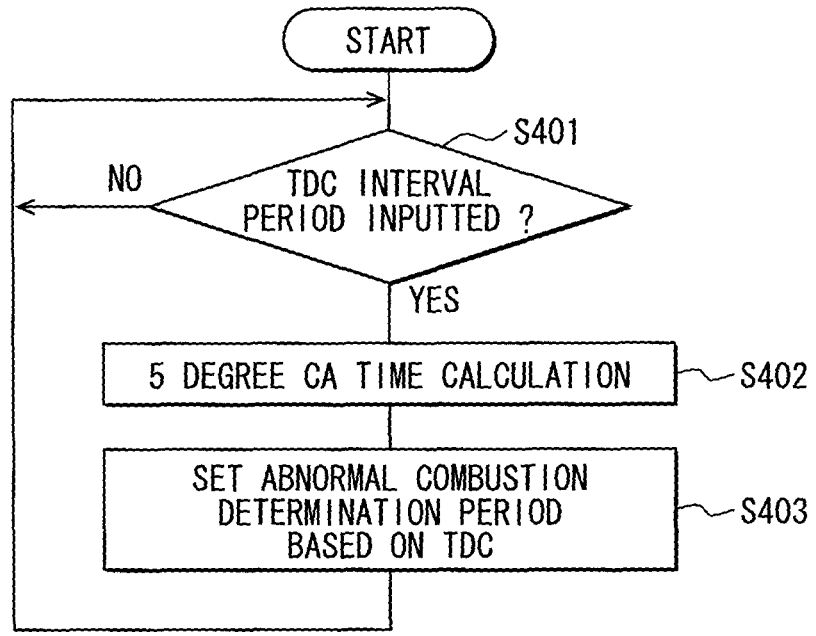
FIG. 4 is a flowchart of an abnormal combustion determination period setting process of the present disclosure.

FIG. 4 is a flowchart of an abnormal combustion determination period setting process performed by the CPU 14. When the TDC interval period is provided from the crank timer 13 to the CPU 14, that is, when the time for 180 degree rotation of the crank is inputted (S401: YES), the CPU 14 calculates, based on the input TDC time, a 5° CA time, i.e., a time of crank rotation for 5 degrees (S402). Based on the TDC timing, a period between −20° CA (BTDC) 20° and 70° CA (ATDC 70°) is set as the abnormal combustion determination period (S403).

Figure 5:
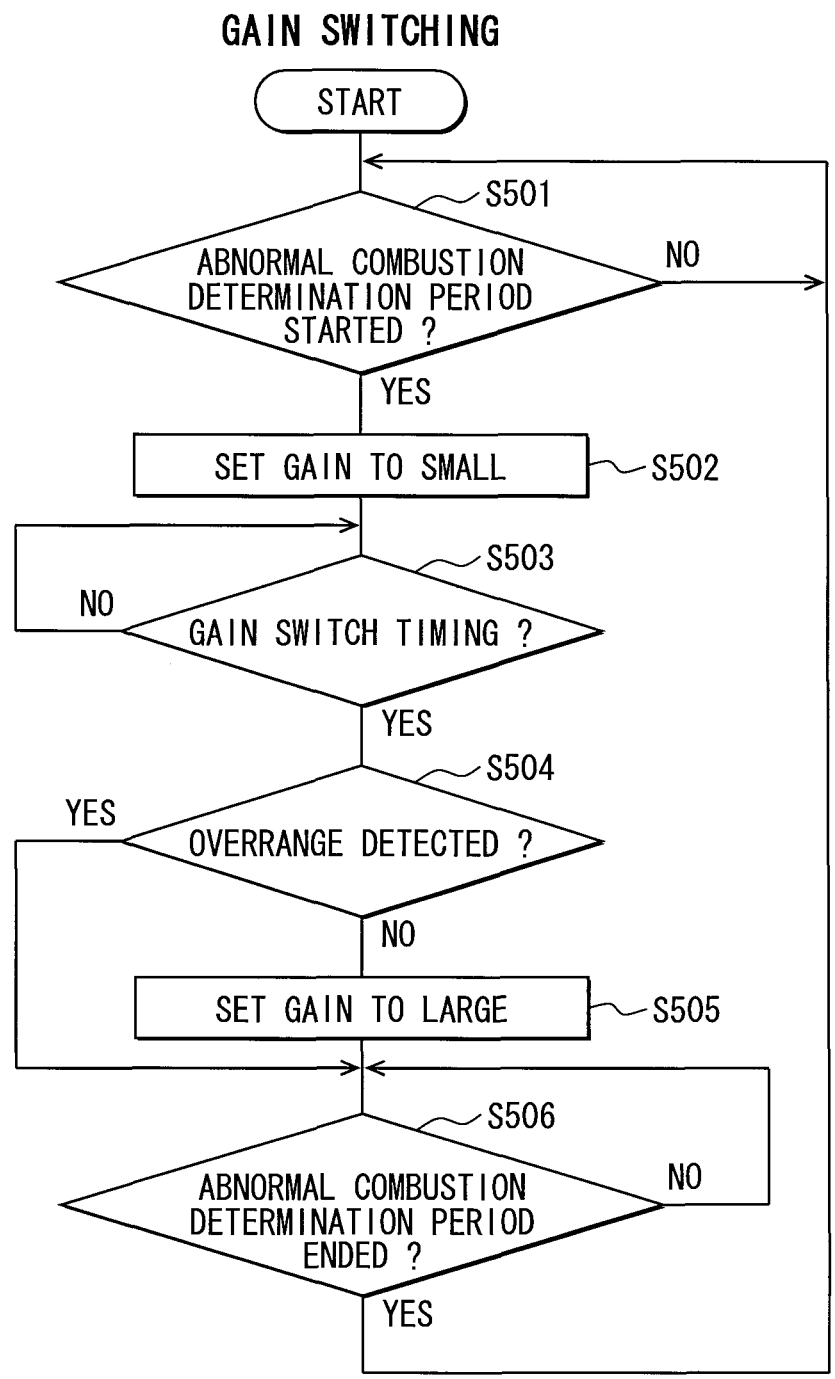
FIG. 5 is a flowchart of a gain switching process of the present disclosure.

FIG. 5 is a flowchart of a gain switching process performed by the CPU 14. When the CPU 14 determines that the abnormal combustion determination period has started (S501: YES), the gain of the gain circuit 6 is set to small, that is, as 1, as an initial setting by the gain switching circuit 12 (S502). This setting is intended for a direct (i.e., non-conversion)

input of the signal waveform of the abnormal combustion signal to the AD conversion circuit 8 for fully utilizing the dynamic range of the AD conversion circuit 8, in view of the fact that the abnormal combustion generated before the ignition timing in the abnormal combustion determination period is the large abnormal combustion having a large vibration amplitude.

Figure 6:
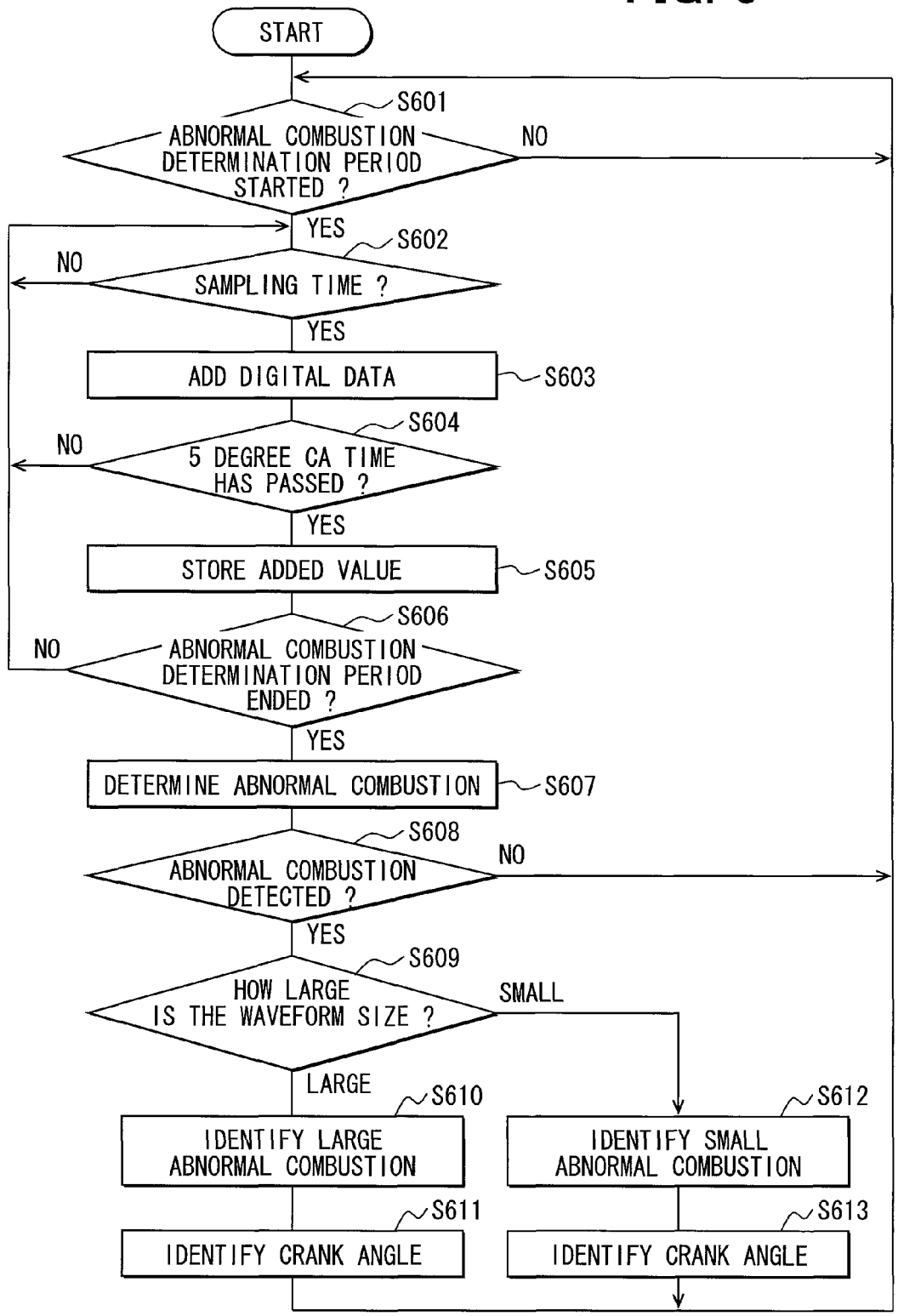
FIG. 6 is a flowchart of an abnormal combustion determination process of the present disclosure.

FIG. 6 is a flowchart of an abnormal combustion determination process performed by the CPU 14. When the CPU 14 determines that the abnormal combustion determination period has started (S601:YES), the CPU 14 determines whether it is a sampling time of the AD conversion circuit 8 (S602), and, if it is the sampling time (S602:YES), the CPU 14 repeats to add the digital data output from the digital filter 10 (S603). When it is not the sampling time (S602:NO) the CPU waits till it is. The CPU 14 determines whether the 5° CA time has passed (S604), where if the 5° CA time has not passed (S604:NO), the CPU 14 continues to add digital data (S603). When the 5° CA time has passed (S604:YES), the CPU 14 determines that the crank has rotated 5 degrees, and stores the added value (S605).

In this case, though the abnormal combustion generated before the ignition timing in the abnormal combustion determination period is captured by fully utilizing the dynamic range of the AD conversion circuit 8 due to the fact that it is always the large abnormal combustion, the abnormal combustion after the ignition timing is the small abnormal combustion, thereby not leading to the full utilization of the dynamic range of the AD conversion circuit 8. Therefore, the ignition timing is set as a gain switch timing, and the gain is switched at such timing.

By repeating the above-described operation, the CPU 14 determines whether it is the gain switch timing (i.e., the ignition timing) (S503). The ignition timing is calculated based on the current driving condition, such as, for example, a start up timing, a warming up timing just after the start up as well as an engine rotation speed, an engine load, a coolant temperature, an exhaust temperature. When it is determined as the gain switch timing (S503:YES), it further determines whether an overrange is detected (S504). Specifically, the overrange circuit detection circuit 11 determines whether an amplitude of the waveform from the vibration sensor exceeds a fixed value, where exceeding the fixed value is provided as an overrange. If the overrange is not detected (S504:NO), the gain is set to large, or 2× (S505), and if the overrange is detected the CPU 14 does not change the gain. After the overrange determination, the CPU 14 determines whether the abnormal combustion determination period is finished (S506). Once, the abnormal combustion determination period is finished (S506:YES) the CPU 14 repeats the gain switching operation of FIG. 5.

Figure 3A:
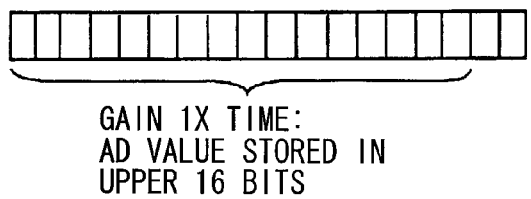
FIGS. 3A and 3B are illustrations of gain correction by a shift register of the present disclosure.
Figure 3B:
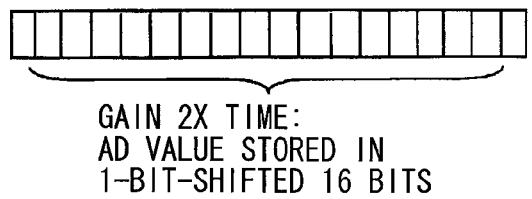

With reference to FIGS. 3A, 3B, when the gain of the gain circuit 6 is switched to large, the CPU 14 shifts the digital data from the AD conversion circuit 8 by one bit toward the lower side after storing it from the most significant bit of the shift register 9. In other words, the two fold data added by the gain circuit 6 is cut by half, thereby canceling the amplification by the gain circuit 6.

Such operation is performed in consideration of the characteristic of the digital filter 10. Specifically, the noise of the digital data in the signal frequency band after the over-sampling and the AD conversion by the AD conversion circuit 8 is reduced by the digital filter 10. However, since the digital filter 10 uses multiple sets of digital data in the past, the gain switching in such configuration leads to a ringing due to a large change between the digital data before gain switching and after gain switching. Therefore, by canceling the gain after the gain switching, the large change between the digital data before and after the gain switching is prevented, thereby preventing the ringing. In such case, if the output data from the digital filter 10 is used to calculate the amplitude difference before and after the gain switching, the data processing for canceling the gain is required. However, the output data from the digital filter 10 can be directly used for comparison as it is.

Further, when the gain of the gain circuit 6 is set to 4×, the digital data stored in the shift register 9 may be shifted by two bits toward the lower side.

When the CPU 14 determines that the abnormal combustion determination period is finished (S606:YES), it determines the abnormal combustion (S607). In other words, since the digital data from each of the sampling timings in the range between BTDC 20° and ATDC 70° is multiplied at every 5° CA and is stored, the CPU 14 can determine the abnormal combustion from a level of such multiplication value. When the abnormal combustion is detected as a result of the abnormal combustion determination (S608:YES), it determines the size of the waveform (S609). In other words, when the waveform amplitude is large (S609:large), the crank angle is identified (S611) after identifying a large abnormal combustion (S610), and, when the waveform amplitude is small (S609:small), the crank angle is identified (S613) after identifying a small abnormal combustion (S612).

Based on the magnitude of the abnormal combustion, the CPU 14 controls the engine ignition timings and the amount of fuel injection.

In this case, at the gain switching timing that is set to the ignition timing, if the signal amplitude input to the AD conversion circuit 8 exceeds the input range of the AD conversion circuit 8, it means that a large abnormal combustion is happening. Therefore, in case that the gain switching is performed in a state of having such a large amplitude signal is being output, the change of the gain of the signal amplitude in the middle has to be considered for calculation, thereby complicating the calculation for determining the abnormal combustion.

Therefore, when the overrange detection circuit 11 detects the overrange at the gain switch timing (S504:YES), the CPU 14 does not perform the gain switching. In such manner, the switch of the gain of the large abnormal combustion in the middle is prevented, thereby ensuring the continuity of the gain and simplifying the calculation for determining the abnormal combustion.

According to the above-described embodiment, the following effects are expected.

In the abnormal combustion determination period, the gain of the gain circuit 6 is switched from a small gain to a large gain at the ignition timing that allows the separation of the small abnormal combustion generation period from the large abnormal combustion generation period, the dynamic range of the AD conversion circuit 8 is utilized to the full. In such a case, the large abnormal combustion is normally finished by the ignition timing at which the gain switches, such a gain switching does not cause a problem in the detection operation for detecting the abnormal combustion.

Further, since the digital data from the AD conversion circuit 8 is corrected by using the shift register 9 for canceling the gain difference before and after the gain switching, the large change of the digital data before and after the gain switching is prevented, thereby preventing the ringing of the digital data. In such a case, the gain difference cancellation processing is required for calculating the amplitude difference of the vibration waveforms before and after the gain switching, the output data from the digital filter 10 can be directly used for comparison as it is, thereby reducing the data processing load of such calculation.

Further, since the gain of the gain circuit 6 is set to have the binary numbers, the gain difference before and after the gain switching is easily cancelled by using the shift register 9.

Further, since the gain switching in the middle of the overrange detection by the overrange detection circuit 11 is prevented, that is, since the gain switching in the middle of an input of the large vibration waveform signal indicating the large abnormal combustion to the AD conversion circuit 8 is prevented, the amplitude value correction calculation for correcting the amplitude due to the gain switching can be reduced.

OTHER EMBODIMENTS

Although the present disclosure has been fully described in connection with the preferred embodiment thereof with reference to the accompanying drawings, it is to be noted that various changes and modifications will become apparent to those skilled in the art.

In the above embodiment, the division by using the shift register at the gain switch timing may be, for example, replaced with the stopping of the operation of the digital filter 10 for a certain period after the gain switching. In such manner, the influence of ringing happening at and around the gain switching is avoided.

The gain of the gain circuit 6 needs not necessarily be limited to 2×, 4×, but may be extended to 8×, 16× and the like.

The shift register may be replaced with an arithmetic circuit, or may be replaced by the CPU 14.

The overrange detection circuit 11, the gain switching circuit 12, and the crank timer 13 may be partially or entirely replaced by a program or the like executed in the CPU 14.

The microcomputer 5 may include the input circuit 4, or a part of the circuit constituting in the microcomputer 5 may be formed as a part not included in the microcomputer 5.

Such changes and modifications are to be understood as being within the scope of the present disclosure as defined by the appended claims.

What is claimed is:

1. An abnormal combustion detection apparatus detecting an abnormal combustion of an internal combustion engine based on a vibration waveform from a vibration sensor attached to the internal combustion engine, the apparatus comprising:
   a gain circuit for amplifying or attenuating the vibration waveform from the vibration sensor;
   an abnormal combustion determination period setting unit for setting an abnormal combustion determination period synchronizing with a rotation of a crank of the internal combustion engine;
   an AD conversion circuit for converting a waveform provided by the gain circuit to digital data;
   a determination unit for determining an abnormal combustion based on the digital data;
   a gain switching unit for switching a gain of the gain circuit from a small gain value to a large gain value at a gain switch timing in the abnormal combustion determination period; and
   a detection unit for determining whether an amplitude of the waveform from the vibration sensor exceeds a fixed value, wherein
   the gain switching unit does not perform gain switching when the detection unit detects the amplitude of the waveform greater than or equal to the fixed value at the gain switch timing.

2. The abnormal combustion detection apparatus of claim 1, wherein the gain switching unit switches the gain at an ignition timing of the internal combustion engine.

3. The abnormal combustion detection apparatus of claim 1, further comprising:
   a digital filter for selecting a predetermined frequency band in the digital data derived from the AD conversion circuit; and
   a correction unit for outputting, to the digital filter, the digital data from the AD conversion circuit in a corrected state for canceling a gain difference between gains before and after the gain switching, wherein
   the AD conversion circuit performs an oversampling of the waveform from the gain circuit.

4. The abnormal combustion detection apparatus of claim 3, wherein
   the gain of the gain circuit is set to have a magnification of a binary number,
   the correction unit is a shift register having a total number of bits formed as (a) a number of bits of the binary number of the digital data from the AD conversion circuit plus (b) a number of bits of the magnification of the binary number, and
   the correction unit stores the digital data in a shifted state according to the magnification of the binary number of the gain set to the gain circuit.

5. The abnormal combustion detection apparatus of claim 1, wherein the digital filter stops an operation for a predetermined time from the gain switch timing.

6. A control unit of an internal combustion engine comprising:
   an abnormal combustion detection apparatus for detecting an abnormal combustion of the internal combustion engine based on a vibration waveform from a vibration sensor attached to the internal combustion engine, the apparatus including:
   a gain circuit for amplifying or attenuating the vibration waveform from the vibration sensor,
   an abnormal combustion determination period setting unit for setting an abnormal combustion determination period synchronizing with a rotation of a crank of the internal combustion engine,
   an AD conversion circuit for converting a waveform provided by the gain circuit to digital data,
   a determination unit for determining an abnormal combustion based on the digital data, and
   a gain switching unit for switching a gain of the gain circuit from a small gain value to a large gain value at a gain switch timing in the abnormal combustion determination period; and
   a detection unit for determining whether an amplitude of the waveform from the vibration sensor exceeds a fixed value, wherein
   the gain switching unit does not perform gain switching when the detection unit detects the amplitude of the waveform greater than or equal to the fixed value at the gain switch timing, and
   multiple control inputs of the internal combustion is controlled according to a detected magnitude of the abnormal combustion detected by the abnormal combustion detection apparatus.

7. The control unit of claim 6, wherein the multiple control inputs of the internal combustion includes a fuel injection amount, a fuel injection timing, and an ignition plug ignition timing of an ignition plug.

8. An abnormal combustion detection apparatus detecting an abnormal combustion of an internal combustion engine based on a vibration waveform from a vibration sensor attached to the internal combustion engine, the apparatus comprising:
- a gain circuit for amplifying or attenuating the vibration waveform from the vibration sensor;
- an abnormal combustion determination period setting unit for setting an abnormal combustion determination period synchronizing with a rotation of a crank of the internal combustion engine;
- an AD conversion circuit for converting a waveform provided by the gain circuit to digital data;
- a determination unit for determining an abnormal combustion based on the digital data;
- a gain switching unit for switching a gain of the gain circuit from a small gain value to a large gain value at a gain switch timing in the abnormal combustion determination period;
- a digital filter for selecting a predetermined frequency band in the digital data derived from the AD conversion circuit; and
- a correction unit for outputting, to the digital filter, the digital data from the AD conversion circuit in a corrected state for canceling a gain difference between gains before and after the gain switching, wherein
the AD conversion circuit performs an oversampling of the waveform from the gain circuit, and
the digital filter stops an operation for a predetermined time from the gain switch timing.

9. The abnormal combustion detection apparatus of claim 8, wherein
the gain switching unit switches the gain at an ignition timing of the internal combustion engine.

10. The abnormal combustion detection apparatus of claim 8, wherein
the gain of the gain circuit is set to have a magnification of a binary number,
the correction unit is a shift register having a total number of bits formed as (a) a number of bits of the binary number of the digital data from the AD conversion circuit plus (b) a number of bits of the magnification of the binary number, and
the correction unit stores the digital data in a shifted state according to the magnification of the binary number of the gain set to the gain circuit.

11. The abnormal combustion detection apparatus of claim 8 further comprising:
a detection unit for determining whether an amplitude of the waveform from the vibration sensor exceeds a fixed value, wherein
the gain switching unit does not perform gain switching when the detection unit detects the amplitude of the waveform greater than or equal to the fixed value at the gain switch timing.

* * * * *